Figure 1:
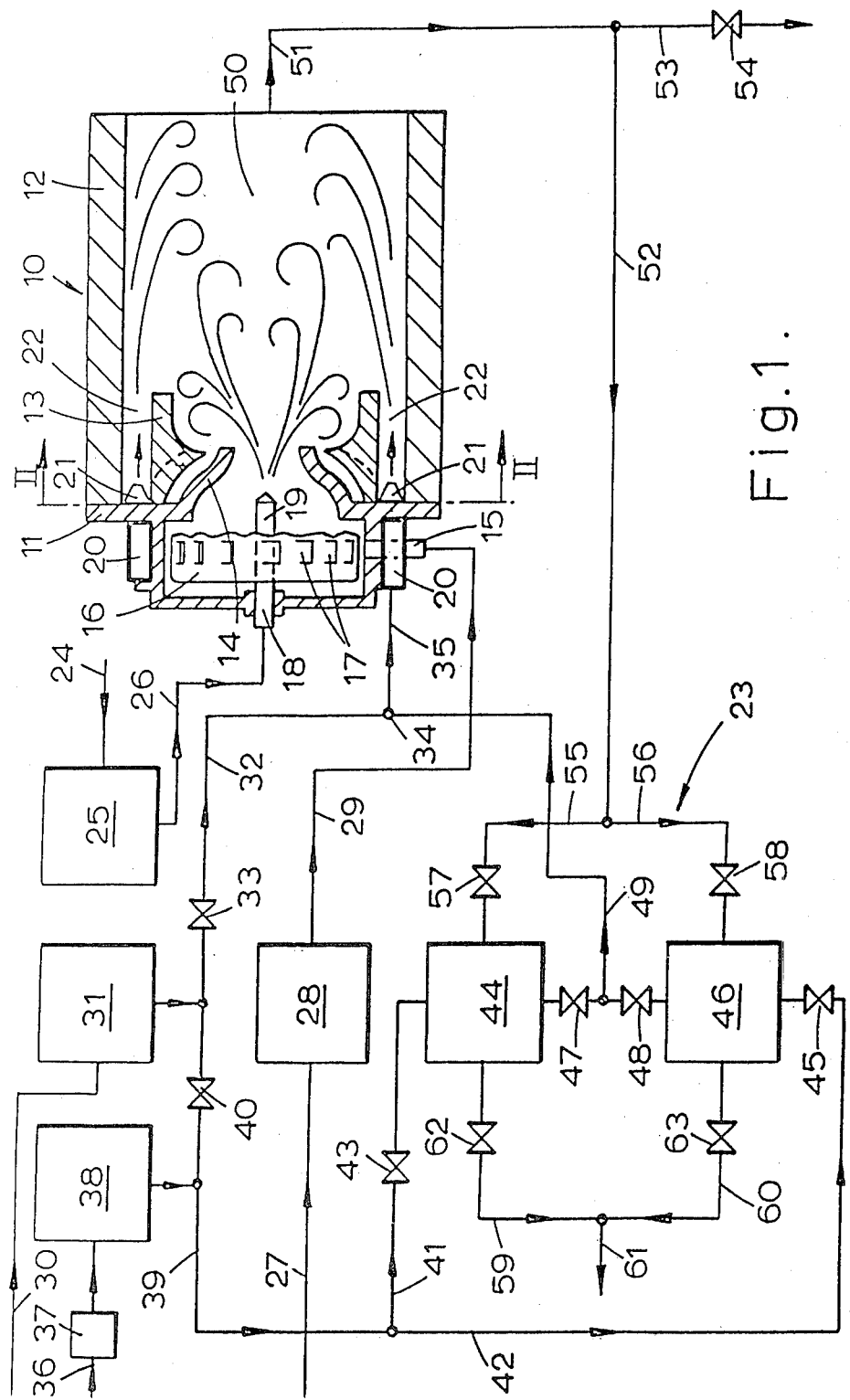

United States Patent [19]

Nixon

[11] 4,425,159

[45] Jan. 10, 1984

[54] METHOD OF USING PARTIAL COMBUSTION BURNERS

[76] Inventor: Ivor G. Nixon, ler Stock Ost, "Matterhorngruss", Zermatt 3920, Valais, Switzerland

[21] Appl. No.: 486,346

[22] Filed: Jul. 8, 1974

[30] Foreign Application Priority Data

Sep. 22, 1970 [GB] United Kingdom ............... 45722/70

[51] Int. Cl.³ .............................................. C21B 5/06
[52] U.S. Cl. ............................................ 75/29; 75/35; 75/42; 431/4; 431/5; 431/9
[58] Field of Search .......................... 75/41, 42, 29, 35; 431/4, 5, 9; 432/210

[56] References Cited

U.S. PATENT DOCUMENTS 2,904,417 9/1959 Te Nuyl ................................. 431/9
3,912,502 10/1975 Miyashita et al. ...................... 75/42

Primary Examiner—M. J. Andrews
Attorney, Agent, or Firm—McAulay, Fields, Fisher, Goldstein & Nissen

[57] ABSTRACT

A hydrocarbon fuel is reacted with molecular oxygen in a burner to produce a gaseous mixture which is chemically reducing, the reactants being surrounded in the burner by a co-axial mantle of cooling gases produced by mixing a hydrocarbon with a gas containing carbon dioxide and/or water vapor. Reactants and cooling gas may subsequently be mixed to form the product gas which may be used in an iron ore reduction plant.

15 Claims, 2 Drawing Figures

METHOD OF USING PARTIAL COMBUSTION BURNERS

This invention relates to the operation of partial combustion burners in which a hydrocarbon fuel is reacted with molecular oxygen to produce a gaseous mixture which is chemically reducing; the reducing constituents of such gaseous mixtures are typically carbon monoxide and hydrogen. Such reducing gas mixtures are widely used in, for example, the petrochemical industry, the production of iron from iron ores (such as in a blast furnace) or the production of molecular hydrogen by recovering this constituent from the reducing gas mixture.

In the operation of such partial combustion burners, the fuel and oxygen or air are supplied in proportions which produce a high carbon monoxide/hydrogen content in the resulting gas mixture; the combustion reactions normally approach equilibrium at a flame temperature of 1200° to 1400° C. and may by typified by the following equation for a hydrocarbon $C_nH_m$:

$$C_nH_m + \tfrac{1}{2}nO_2 \rightleftarrows nCO + \tfrac{1}{2}mH_2 \qquad (1)$$

Steam has been used as a moderator for combustion reactions in partial combustion burners and this component is normally admitted to the burner mixed with the air and/or oxygen. The steam is also capable of reacting with a hydrocarbon to produce reducing gases, e.g.:

$$C_nH_m + nH_2O \rightleftarrows nCO + (\tfrac{1}{2}m+n)H_2 \qquad (2)$$

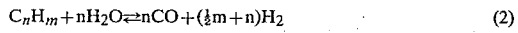

Known partial combustion burners suffer from several disadvantages. If the burner suffers from wear or other damage (typically resulting from the high reaction temperatures), the burner flame can become distorted and as a result impinge upon the refractory lining of the combustion chamber, thus causing serious damage. In extreme cases, the burner casing may even burn through and cause fire or explosion. Alternatively a fluctuation in the ratio of the hydrocarbon to the oxidising gas, particularly when using oxygen, can cause the flame temperature to rise excessively and give a similar result. The high temperature necessary to obtain the desired degree of reaction yields a reducing gas at a higher temperature than may be required for its ultimate use and this energy is either wasted or recovered by the use of auxiliary apparatus, such as a waste heat boiler. The oxygen consumption of these burners is relatively high per unit of reducing gas produced and this makes the process relatively expensive.

The present invention provides a method of operating a burner in which a hydrocarbon fuel is reacted with molecular oxygen to produce a gaseous mixture which is chemically reducing, and in which the reactants are surrounded in the burner by a co-axial mantle of cooling gases produced by mixing a hydrocarbon with a gas containing carbon dioxide and/or water vapour.

The gases used for the cooling stream will not interfere with the ultimate use of the reducing gases when mixed with the combustion products from the burner.

The cooling gases react to produce reducing gases themselves and consist of a mixture of a hydrocarbon with a gas mixture containing water vapour and/or carbon dioxide. Carbon dioxide is particularly useful as a hydrocarbon oxidant since it is capable of reacting with hydrocarbons to produce reducing gases at a temperature about 200° C. lower than that required to obtain the corresponding degree of conversion when using water vapour as the oxidant. Advantageously, the oxidant is top gas obtained from a blast furnace or other plant which is used for the production of iron from iron ores. Top gas contains a high proportion of carbon dioxide together with water vapour and when reacted in a partial combustion burner with natural gas (consisting essentially of methane), the autogeneous oxidation of the methane which takes place at about 1200° C. to 1400° C. is mainly:

$$CH_4 + CO_2 \rightarrow 2CO + 2H_2 \qquad (3)$$

$$CH_4 + H_2O \rightarrow CO + 3H_2 \qquad (4)$$

Similar reaction schemes apply when hydrocarbons other than methane are used. It is not necessary that the hydrocarbon (or mixture of hydrocarbons) used in the cooling stream be the same as that used in the partial combustion flame itself. For example, the hydrocarbon consumed in the flame can be a heavy fuel oil whereas that in the cooling stream can be a light petroleum fraction. A hydrocarbon, or a mixture of hydrocarbons, containing from 1 to 13 carbon atoms is, however, preferred for either or both streams.

The ratio of the hydrocarbon component to the oxidising component present in the cooling gas stream can be roughly in the stoichiometric proportions required for production of reducing gases so that the cooling stream is completely autogeneous. However, I have found that it may be preferable to adjust the composition of the cooling gas stream so that it reacts with one or more of the components from the partial combustion flame itself. For example, the cooling gas composition may be adjusted to have an oxygen balance higher than that required for the optimum autogeneous reaction and the proportions of the flame reactants adjusted to have an oxygen balance lower than that required for optimum operation so that on mixing of the two streams in the reaction space of the burner, they complement one another to produce a reducing gas product of desired composition. Alternatively, the oxygen balance of the cooling stream may be lower than that required for optimum reaction and that of the flame reactants correspondingly higher. In this fashion, maximum benefit can be obtained from the oxidising gases in the cooling stream and it is possible to reduce the quantity of oxygen to be burnt in the partial combustion flame.

The inlet manifold of the cooling stream to the burner will typically be of annular shape and preferably vanes are inserted in the inlet to induce a rotary motion to the cooling stream so that the burner walls are swept by the cool gases, thus affording the walls maximum protection from overheating. The cooling stream becomes heated by the burner flame and owing to turbulence, ultimately becomes mixed with the combustion gases from the flame. It may be desirable to provide a means for delaying this mixing to obtain the maximum shielding effect by the cooling gases. This may be accomplished by inserting a heat resistant annular shroud between the cooling stream inlet and the flame so that the shroud projects into the reaction space in the burner in a longitudinal direction, with respect to the flame.

If it is desired that the cooling stream and the flame components complement each other to provide the reducing gases of the required composition, then the cooling stream can be injected into the burner coaxially with respect to the flame gases through ports designed to produce turbulence so that there is an ultimately efficient mixing of the gas streams in the reaction space in the burner, i.e. after the burner itself as discussed above.

By regulating the proportion and temperature of the cooling gas stream relative to the flame reactant, the final temperature of the mixed gases can be regulated to the desired level for reaction, normally about 1200° C. to 1400° C.

In order to reduce oxygen consumption, some or all of the components fed to the burner may be heated prior to entry to the burner. Any suitable means may be used to preheat the components, such as tubular, sand or pebble furnaces. The temperature to which these components should be heated is normally above 300° C. and preferably from 700° to 1200° C. Thus the hydrocarbon and the gas containing carbon dioxide and/or water vapour are preferably both heated before or after mixing to a temperature of from 700° to 1200° C. It should be noted that the cooling stream components may still cool the flame products even when they are preheated to this upper temperature limit. This is possible since the oxidation of hydrocarbons to produce a reducing gas, such as by reactions (3) and (4) above, is highly endothermic and this provides a built-in cooling effect for the gases.

It is desirable to pass the product gases (the flame products mixed with the cooling stream) from the partial combustion burner over a suitable catalyst to complete the reactions producing the reducing gases. The use of such a catalyst is already well known but the catalyst quickly loses its activity owing to the deposition of carbonaceous material thereon.

I have found that this problem may be reduced by regenerating the catalyst using the oxidant gas component of the cooling gas stream prior to feeding this component to the partial combustion burner. Two or more catalyst chambers are connected into the gas streams passing to and from the partial combustion burner so that when one or more chambers are being used to catalyse the completion of the reactions producing gases (i.e. the gases issuing from the burner), one or more other chambers are simultaneously regenerated by the oxidising component of the cooling stream being fed to the burner. The latter operation is accomplished, for example, by passing top gas (from an iron ore reduction plant and suitably heated to a temperature of above 700° C.) through the catalyst chamber(s) en route for the partial combustion burner. The carbonaceous matter in the spent catalyst is burnt off and the regenerated catalyst can then be switched into operation whilst the stream of top gas is simultaneously switched over to another chamber containing spent catalyst. This cyclic operation continues by repeating the switchover from chamber to chamber. When all or part of the hydrocarbon component of the cooling streams is present with the oxidising component whilst it passes through the catalyst chamber(s), the proportion of the oxidant must be regulated so as to provide a sufficient oxygen balance to oxidise the carbonaceous matter on the catalyst. The catalyst can also be contained is heated tubular units instead of in catalyst chambers.

Any suitable catalyst can be used to promote the production of the reducing gases, nickel compounds, for example, are especially suitable.

Figure 2:
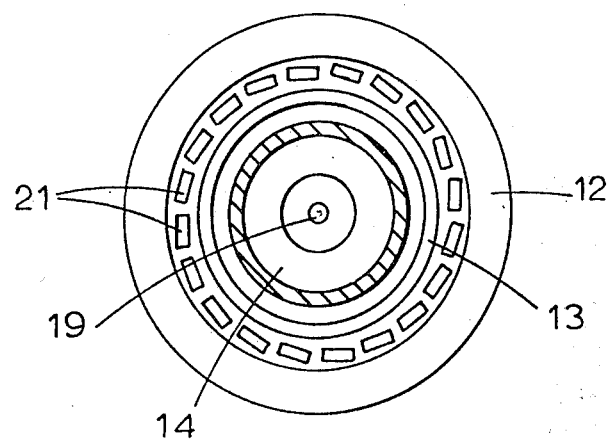

In order that the invention may be more fully understood, a preferred embodiment will be described by way of illustration only with reference to the accompanying drawings in which:

FIG. 1 shows a cross-sectional diagram of a partial combustion burner together with a schematic diagram of a burner supply system for use with a blast furnace, and FIG. 2 shows a section on line II—II of the burner shown in FIG. 1.

Referring to FIGS. 1 and 2 a partial combustion burner 10 has a body 11 of circular cross-section and a cylindrical casing 12 lined with refractory material which encloses a reaction space 50 extending horizontally from body 11. The burner 10 has an output line 51 for partially combusted gas (shown schematically) connected to the burner casing 12 at the end of the casing distant from the burner body 11. A cylindrical heat-resistant shroud 13 is attached to the body 11 and lies within casing 12 so as to form an annular space 22 between the shroud 13 and the casing 12.

The burner body 11 includes a throat 14 which protrudes within the shroud 13. An oxygen inlet 15 passes diametrically through one wall of the burner body 11 and connects with a jacket 16 within body 11. Oxygen ports 17 are spaced at intervals around the circumference of jacket 16 and are directed tangentially to the surface of jacket 16. A fuel inlet 18 connected with a fuel jet 19 is positioned centrally within the body 11.

Surrounding body 11 is an annular conduit 20. Nozzles 21 are positioned around conduit 20 and are directed into the annular space 22 between shroud 13 and casing 12.

Referring to FIG. 1, a burner supply system 23 incorporates several sub-systems each of which will be described in turn.

A fuel oil storage tank (not shown) is connected by pipe-line 24 to oil heater 25. The oil heater 25 is in turn connected by pipe-line 26 with the burner fuel inlet 18.

A pipe-line 27 for oxygen connects an oxygen supply (not shown) with an oxygen heater 28. A further pipe-line 29 connects the oxygen heater 28 with the burner oxygen inlet 15.

A natural gas pipe-line 30 connects with a heater 31 for natural gas which is in turn connected by pipe-line 32 and a valve 33 to a manifold 34. Manifold 34 is connected by pipe-line 35 to the annular conduit 20 which surrounds the burner body 11.

A compressor or blower 37 has an input 36 for blast-furnace top gas. The output from blower 37 is connected with a heater 38 for top gas and the output from the heater 38 is connected into pipe-line 39. Pipe-line 39 is connected at one end to pipe-line 32 by valve 40, and at the other end to pipe-lines 41 and 42. Pipe-line 41 passes through a valve 43 to a first catalyst chamber 44, whilst pipe-line 42 passes through valve 45 to a second catalyst chamber 46. The first and second catalyst chambers 44 and 46 are connected at their outputs through valves 47 and 48 so that either catalyst chamber can be connected to output pipe-line 49 which leads to manifold 34.

The output line 51 for product gas from the burner 10 is connected with pipe-lines 52 and 53. Pipe-line 53 contains a valve 54 and leads to a blast-furnace (not shown). Pipe-line 52 splits into two further pipe-lines 55 and 56 which lead to the first and second catalyst chambers 44 and 46 respectively. Each line 55 and 56 has a valve 57 and 58 respectively. The catalyst chambers 44 and 46 have outlet pipe-lines 59 and 60 respectively for partially combusted gas which meet to form a common pipe-line 61 to the blast-furnace. Pipe-lines 59 and 60 contain valves 62 and 63 respectively.

The operation of the burner 10 and the supply system 23 will now be described in detail.

Valves 33, 43, 47, 58 and 63 are in the open position and valves 40, 45, 48, 54, 57 and 62 are in the closed position.

Fuel oil is heated in oil heater 25 and passes along pipe-line 26 to the burner fuel inlet 18 emerging from fuel jet 19 as a fine spray. Oxygen enters oxygen heater 28 via pipe-line 27 and the heated oxygen is fed to the burner oxygen inlet 15 via pipe-line 29. The heated oxygen enters jacket 16 leaving via ports 17 to mix with the spray of fuel oil from fuel jet 19. This mixture is ignited and reacts within the reaction space 50. The oxygen leaving ports 17 acquires a rotational component of motion, accentuated by the shape and size of the burner throat 14, causing turbulent and intimate mixing with the fuel oil spray at an early moment and thus a short flame cone at the burner throat 14.

At the same time, natural gas is passed along pipe-line 30 into heater 31 and thence along pipe-line 32 to the manifold 34. Also, blast-furnace top gas enters blower 37 via pipe-line 36 and is forced through heater 38 before passing via pipe-lines 39 and 41 into the first catalyst chamber 44. The catalyst chamber 44 at this stage contains spent catalyst i.e. catalyst coated with carbonaceous material. The carbonaceous material is burnt off the catalyst by the oxidants in the hot blast-furnace top gas and the catalyst is thus regenerated. The top gas then passes out of catalyst chamber 44 via valve 47 and pipe-line 49 to the manifold 34. Here the heated top gas mixes with the heated natural gas and passes along pipe-line 35 to enter the annular conduit 20 which surrounds the burner body 11. The mixed gases, which are appreciably cooler than the combustion gases formed in reaction space 50, enter annular space 22 between the shroud 13 and the casing 12 via nozzles 21. The nozzles 21 are set at a slight angle to the direction of the burner axis so that the cooling gases sweep the burner casing 12 with a rotary motion. These cooling gases form a mantle which shields the inner walls of the casing 12 from the very hot combustion gases for a distance greater than the extent of shroud 13. However, eventually the cooling gases and the combustion gases mix and react to form a product gas which has chemically reducing properties. This product gas leaves the burner along output line 51.

To enhance the chemically reducing properties of the product gas from the reaction space 50 of burner 10, the gas is passed over a nickel compound which acts as a catalyst in the conversion of constituents in the output gas to chemically reducing gases. After leaving the burner by output line 51, the product gas passes along pipe-lines 52 and 56, through valve 58, and into the second catalyst chamber 46. The reducing gas leaves the catalyst chamber 46 by outlet pipe-line 60, passes through valve 63, and is transferred by pipe-line 61 to the blast furnace, where it is used to reduce iron ore to iron.

When the catalyst in the second catalyst chamber 46 is spent, or coated in carbonaceous material, it is regenerated by passing top gas over it. In normal operation therefore, the catalyst chambers 44 and 46 are interchanged at predetermined intervals so that each chamber remains in the product gas stream for a time which is determined by the activity of the catalyst. The catalyst chambers 44 and 46 are switched over by a time controlled automatic servo-system which opens and closes the necessary valves. In changing from the state described above, valves 43, 47, 58 and 63 are closed simultaneously with the opening of valves 45, 48, 57, and 62. Now the product gases from pipe-line 52 follow pipe-line 55, through valve 57 and first catalyst chamber 44, and to the blast-furnace via output pipe-lines 59 and 61. The heated top gas now passes along pipe-line 42 through the second catalyst chamber 46 and into pipe-line 49 to be delivered to manifold 34.

When catalytic conversion of the product gases is not required, the catalytic chambers 44 and 46 can be bypassed. This is done by opening valve 54 and closing valves 57 and 58 so that the product gases go directly to the blast-furnace via pipe-line 53. At the same time valve 40 is opened and valves 43 and 45 are closed so that the hot top gas is fed directly to the burner manifold 34 together with the heated natural gas.

If appreciable mixing of the cooling gases and the combustion gases is required, the burner shroud 13 can be replaced by a shorter shroud as shown by the dotted line in FIG. 1. This allows the cooling gases to commence mixing with the turbulent combustion gases at an early stage. The nozzles 21 may be inclined slightly towards the burner axis to assist in this early mixing.

Known partial combustion burners may be modified for use according to the invention by providing them with means for introducing a coaxial mantle of cooling gases around the reactants in the burner, and preferably by providing them with a shroud to define a coaxial space between the burner casing and the shroud, the cooling gases being introduced into this space.

I claim:

1. In a method for operating a burner in which a hydrocarbon fuel is reacted with molecular oxygen to produce a product gas which is a chemically reducing gaseous mixture, the improvement which comprises:
   a. surrounding a mixture of a first hydrocarbon fuel and molecular oxygen in said burner with a coaxial mantle of cooling gases; and
   b. producing said cooling gases by mixing a second hydrocarbon with a gas containing carbon dioxide and/or water vapor.

2. Method according to claim 1, in which said first hydrocarbon fuel and molecular oxygen are mixed with said cooling gases before leaving said burner to form a product gas.

3. Method according to claim 2, in which said product gas is passed over a catalyst to increase the reducing properties of said gas after leaving said burner.

4. Method according to claim 3, in which said catalyst is a nickel compound.

5. Method according to claim 3, in which said catalyst is regenerated by blast-furnace or other iron ore reduction plant top gas at a temperature of above 700° C.

6. Method according to claim 1 in which said product gas has a temperature of about 1200° C. to about 1400° C.

7. Method according to claim 1, in which said gas containing carbon dioxide and/or water vapor is a blast furnace or other iron ore reduction plant top gas.

8. Method according to claim 1 in which either of said first hydrocarbon and said second hydrocarbon contains from 1 to 13 carbon atoms.

9. Method according to claim 1 in which either of said first hydrocarbon and said second hydrocarbon is natural gas.

10. Method according to claim 1 in which said cooling gases have an oxygen balance higher than that required for optimum autogeneous reaction, and said first hydrocarbon fuel and molecular oxygen have an oxygen balance lower than that required for optimum autogeneous reaction.

11. Method according to claim 1, in which said cooling gases have an oxygen balance lower than that required for optimum autogeneous reaction, and said hydrocarbon fuel and molecular oxygen have an oxygen balance higher than that required for optimum autogeneous reaction.

12. Method according to claim 1, in which said coaxial mantle of cooling gases has a rotary motion.

13. Method according to claim 1, in which said second hydrocarbon is heated to above 300° C. before mixing with said gas containing carbon dioxide and/or water vapor.

14. Method according to claim 1, in which said gas containing carbon dioxide and/or water vapour is heated to above 300° C. before mixing with said second hydrocarbon.

15. Method according to claim 1, in which said second hydrocarbon and said gas containing carbon dioxide and/or water vapor are both heated before or after mixing to a temperature of from 700° to 1200° C.

* * * * *